July 10, 1945.  H. ZIEBOLZ  2,380,357
FOLLOW-UP DEVICE MORE PARTICULARLY FOR MACHINE TOOLS
Filed May 8, 1940  2 Sheets-Sheet 1

Inventor.
H. Ziebolz
By A D Adams
Attorney

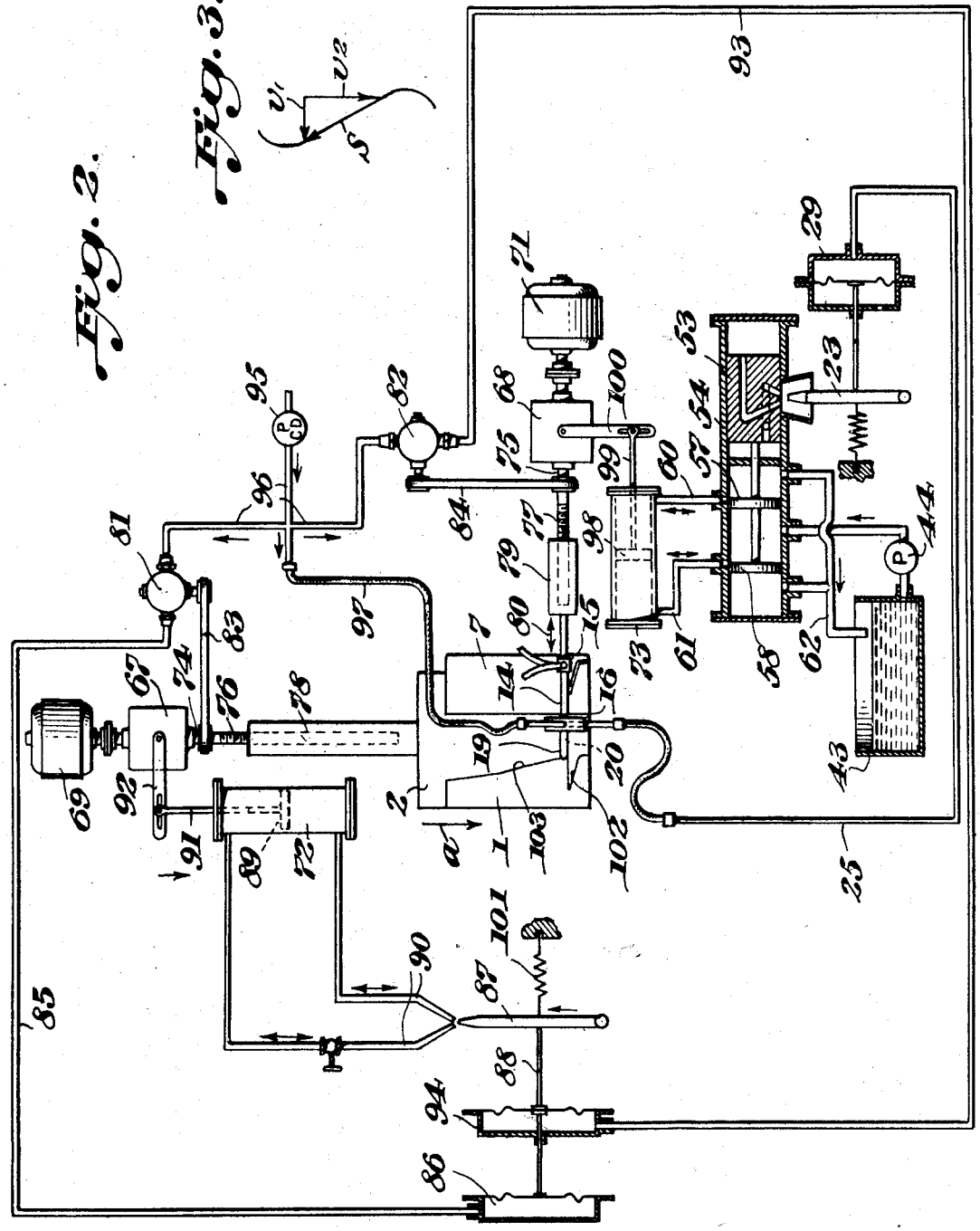

Patented July 10, 1945

2,380,357

UNITED STATES PATENT OFFICE 2,380,357

FOLLOW-UP DEVICE, MORE PARTICULARLY FOR MACHINE TOOLS

Herbert Ziebolz, Chicago, Ill., assignor to Askania Regulator Company, Chicago, Ill., a corporation of Illinois Application May 8, 1940, Serial No. 334,041
In Germany May 26, 1939

11 Claims. (Cl. 90—13.5)

The present invention relates to pattern or template controlled mechanisms for machine tools and the like, in which the tool must follow a definite contour. More particularly, the present invention relates to a number of modified mechanisms and systems of those disclosed in applicant's copending application Ser. No. 304,829, filed November 16, 1939, now Patent No. 2,254,098.

Frequently, it is desirable to provide for a constant rate of relative movement of the fluid jet along the controlling edge of the pattern or template. This will, for instance, be desirable in many cases where the follow-up device according to the copending application is to be employed in connection with machine tools and cutting torches. In order to automatically control a cutting burner or flame jet in accordance with a predetermined curve, it is essential to maintain the speed of the fluid jet along the controlling edge of the pattern constant so as to achieve a constant cutting rate.

For this reason, according to the present invention, additional controlling means are provided for a motor displacing the pattern in its longitudinal direction, said additional controlling means influencing the speed of said motor, in response to the speed of the follow-up device, in such manner that the linear rate of travel or the relative movement of the fluid jet along the controlling edge of the pattern remains constant.

Such additional controlling means are preferably based on the following relation between the longitudinal movement of the pattern, the follow-up movement and the relative movement of the fluid jet. Considered vectorially, the velocity of the relative movement of the jet remains constant, provided the sum of the squares of the two other velocities is maintained constant, if the tool movement is perpendicular to the pattern movement.

Accordingly, it follows that, not the speed per se, but the squares of the speeds have to be taken into consideration. This, however, does not complicate the matter if the motor displacing the pattern in its longitudinal direction and the follow-up motor are driven by a pressure fluid, as in this case the value proportional to the square of the velocity may be derived very simply from the pressure fluid amount (proportional to the working speed of the motor), by means of a dynamic pressure, it being understood that the dynamic pressure varies in accordance with the square of the velocity of the pressure fluid and the speed of the motor, respectively. Hence, only a simple pressure system need be provided for each of the two motors, each of these pressure systems being acted upon by the respective dynamic pressure. The two pressure systems are additively arranged and balanced by means of a counter-force, the magnitude of which represents the desired rate of the relative movement of the jet along the controlling edge of the pattern. Such counter-force may be varied in accordance with the desired rate of travel of the fluid jet along the controlling edge.

These and other advantages and objects will appear from a consideration of the description, which follows, with the accompanying drawings showing embodiments of the invention for illustrative purposes. It is to be understood that this detailed description is not to be taken in a limiting sense, the scope of the invention being defined by the appended claims.

Referring to the drawings:

Fig. 2 is a diagrammatic view of a modified form of the invention; and

Fig. 3 is a diagram.

Figure 1:
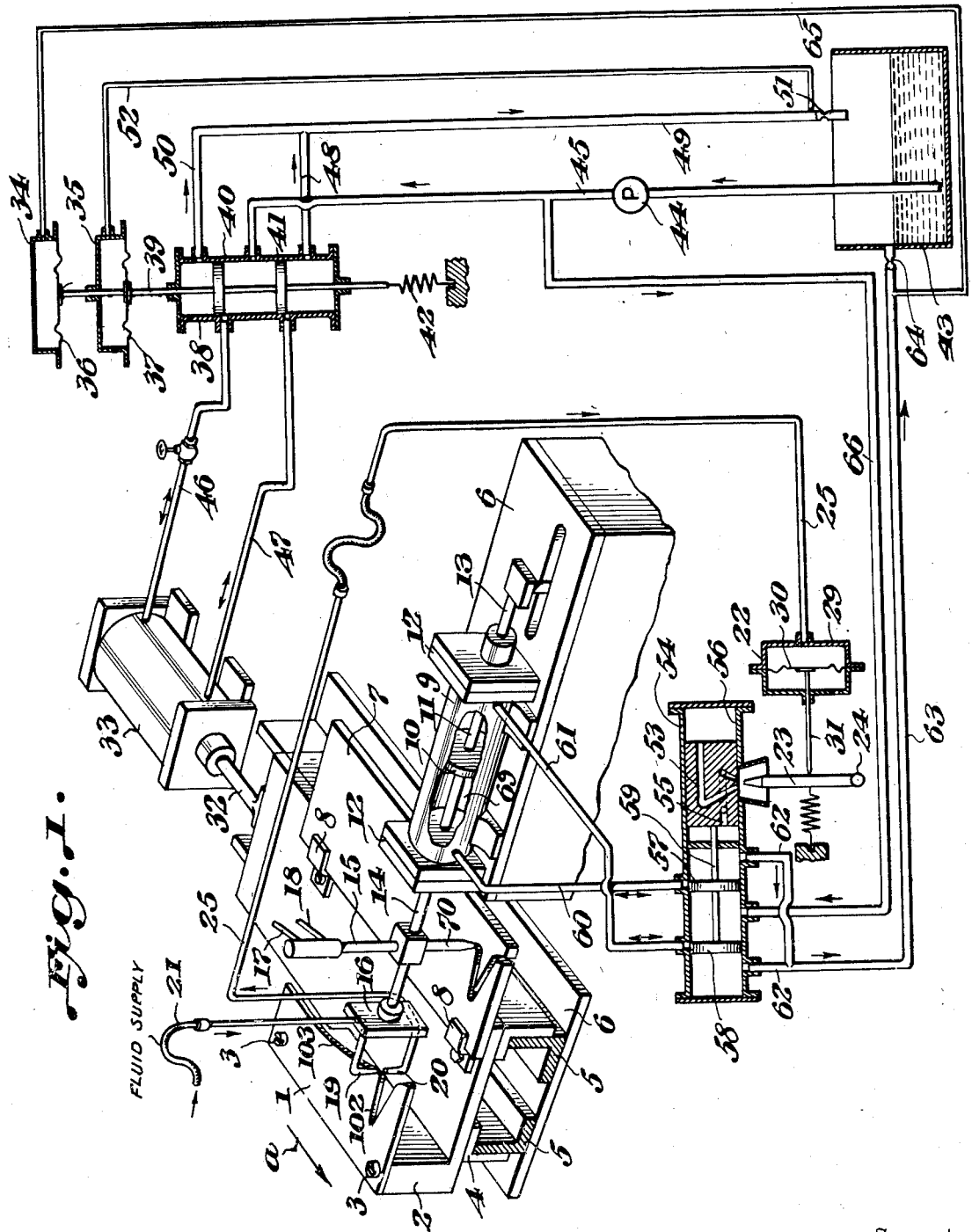
Fig. 1 is an isometric view, partly diagrammatic, and sectional, of the control and operating mechanism as applied to a tool.

In the construction of Fig. 1 a pattern, template 1 or the like, to be followed or reproduced, is of any desired shape and edge contour and may be removably secured to a table slide 2 by any suitable means such as bolts 3. The slide is mounted on angle irons 4 which in turn slide on angle irons 5 secured on a stationary frame or bed 6. The work 7, in the form of a plate, out of which the pattern contour is to be cut, is also mounted on the slide 2 and is held securely in place by clamps 8 or by any other suitable means.

A cylinder 9 is mounted on the stationary frame 6 and a double-acting piston 10 is adapted to reciprocate therein by means of a rod 11, which latter is guided in the end plates or cylinder heads 12. This rod 11 is guided at one end 13 in the bed 6 and the other end 14 carries a tool 15 and a plate 16.

The tool 15 may comprise any suitable cutting device, such as a narrow milling cutter (not shown), rotated by any suitable means, such as a motor (not shown), or the tool may be a cutting torch 70 having a flexible tube 17 for air and a flexible tube 18 for acetylene or the like.

The plate 16 supports and directs a vertical fluid stream or jet created by the nozzle 19 and received in the nozzle 20. The fluid pressure medium is preferably air supplied by the flexible tube 21 and this air supply must be substantially constant. The air received in the receiving nozzle 20, by means of a tube 25, controls a fluid pressure relay or regulator 22 of the well known "Askania" jet-pipe type which includes a movable jet-pipe 23 pivoted at 24 and supplied with pressure fluid (preferably oil), from a suitable source (not shown). The jet-pipe nozzle 23 is controlled by a differential pressure device comprising a casing 29 separated into two chambers by a diaphragm 30. The movement of the diaphragm is transmitted to the jet-pipe nozzle by means of a link 31. The table slide 2 may be actuated by means of a hydraulic system including a piston rod 32 secured to the slide and reciprocated by a hydraulic motor having a cylinder 33.

The foregoing description corresponds to the details of construction of applicant's copending application. The additional controlling means, according to the present invention, comprises two diaphragm chambers or casings 34 and 35, the diaphragms 36 and 37 of which are arranged in series and operatively connected to a controlling slide valve 38 by means of the rod 39. This slide valve 38 has two pistons 40 and 41 and is acted upon in the opposite direction by a spring 42 for producing a counter-force. The valve 38 controls the supply of pressure fluid, such as oil, to the hydraulic motor, from a reservoir 43 by means of a pump 44 and pipe or conduit 45. The valve 38 thus supplies pressure fluid to the cylinder 33 through conduit 46 to operate a piston in the cylinder and move the piston rod 32, pattern 1 and table slide 2 in the general direction of the arrow $a$. The fluid discharges from the cylinder 33 from the opposite side of the piston therein through the conduit 47 and from the valve 38 through the conduit 48 and conduit 49 back to the reservoir. It is of course obvious that, since an object of this invention is to vary the rate of travel of the table slide 2, template 1 and work 7, the rate of flow in the conduit 46 into the cylinder 33 and the rate of flow in the conduit 47 out of the cylinder 33, together vary, the dependent upon the extent of the throttling action of the pistons 40 and 41, relative to the inlet orifices of the conduits. If, for instance, a cut is made which is perpendicular to the direction of travel of the burner 70, the slide 2 will be stationary and the pistons 40 and 41 will be moved to completely close the inlet orifices of the conduits 46 and 47. This control for the pistons 40 and 41 will be more fully described hereafter.

The conduit 49 is provided with a constriction 51 of any suitable construction, to provide a dynamic pressure in a by-pass conduit 52 and chamber 35. The pressure in the chamber 35 is proportional to the square of the rate of travel in the piston or rod 32 of the cylinder 33, as this pressure varies with the second power of the pressure fluid passing through the constriction 51. This pressure fluid amount, however, is directly proportional to the speed of the rod 32 and of the template.

Instead of controlling the operation of the piston 10 directly by the jet pipe 23, the latter indirectly controls this piston by means of a so-called auxiliary or follow-up piston 53, in the form of a sliding distributor block, in the cylinder 54, the block having opposed passages 55 so that the jet fluid controls its position in the chamber 56. The piston 53 is connected to and displaces a slide valve having two pistons 57 and 58 mounted on the rod 59. Two conduits 60 and 61 lead from the cylinder 54 to the cylinder or follow-up motor 9. Two discharge conduits 62 are in communication with the return conduit 63 from the cylinder 54 and this conduit 63 is provided with a constriction 64. The dynamic pressure in the conduit 63 acts, through a by-pass conduit 65, upon the diaphragm 36 in the chamber 34, so that in this chamber the pressure varies with the square of the speed of the follow-up piston 10.

The pressure fluid is supplied by the pump 44 through the conduit 66 and returns through the conduit 63 to the tank 43. No difficulties are encountered by deriving the dynamic pressure from the pressure fluid from the follow-up motor 9, even if its piston 10 reverses its direction during the follow-up movement. After adjustment of the initial tension of the spring 42 upon any disturbance of the balance between the spring force and the sum of the two controlling pressures in the chambers 34 and 35, the slide pistons 40 and 41 will be displaced or adjusted and consequently the sum of said pressures will be varied until the balance is restored, i. e., until the sum of said pressures again attains the value determined by the initial tension of the spring. As is evident from the following considerations, the rate of the relative movement of the jet discharged from the nozzle 19 along the controlling edge of the pattern 1 remains constant if the sum of the controlling pressures in the diaphragm chambers 34 and 35 is kept constant.

The rate of the said relative movement is in a vectorial sense equal to the sum S, Fig. 3, of the two speed components, namely the follow-up speeds $v_1$ and the pattern displacement speed $v_2$. Geometrically, the vector of the velocity S is the hypotenuse of the right-angled triangle, having the perpendicular sides $v_1$ and $v_2$, so that the sum of the squares of the two perpendicular sides is equal to the square of the hypotenuse.

Referring to Fig. 2, the pressure fluid motors for displacing the nozzles 19 and 20, on the one hand, and for displacing the pattern 1, on the other hand, are each replaced by a constant speed electric motor 71 and 69 so that the controlling speeds of the nozzles 19 and 20 and the pattern 1 cannot be measured by means of the respective dynamic pressure.

For this purpose, transmission gears 67 and 68 are inserted between the electric motors 69 and 71, respectively, and the nozzles 19 and 20 and the pattern 1, respectively. The transmission ratio is changed by means of the servo-motors 72 and 73, respectively.

The output or actuating shafts 74 and 75 of the two transmission gears 67 and 68 respectively, are each coupled or connected with a threaded spindle 76 and 77 respectively and the latter are each in internal screw threaded engagement with connecting members 78 and 79, respectively. The connecting or driving members 78 and 79 are driven in such a manner that, upon rotation of the spindles 76 and 77, an axial displacement of the connecting members 78 and 79 will result, due to the screw threaded engagement.

The transmission gears 67 and 68 may be of any well known type, with a friction wheel shiftable relative thereto or a hydraulic variable speed drive. An axial displacement of the connecting member 78 will cause a unitary movement of the template 1, work 7 and table slide 2 in the direction of the arrow $a$, and an axial displacement of the connecting member 79 will cause a unitary movement of the plate 16, nozzles 19 and 20, rod end 14 and the tool 15 in the directions of the arrow 80.

It is essential that impulses be derived from the rate of speed of the two shafts 76 and 77 and that these impulses vary with the square of the speeds in order to add these two impulses and maintain their sum constant. For this purpose, a centrifugal regulator or pneumatic speedometer 81 is connected to be rotated from the shaft 74 by means of a driving belt 83, and a centrifugal regulator or pneumatic speedometer 82 is connected to be rotated from the shaft 75 by means of a driving belt 84. The construction of each centrifugal regulator may, for example, comprise a type shown in Fig. 5 of applicant's prior Patent No. 2,185,970, issued January 2, 1940. It is thus quite evident that the speed of rotation of the pneumatic speedometer 82 follows the rotation of the shaft 75 and consequently the movement of the nozzle 19. Upon an increase in the rate of rotation of the shaft 75, the regulator 82 will react to increase the pressure of the fluid in the conduit 93 and in turn increases the pressure in the diaphragm chamber or casing 94. This causes a movement of the jet pipe 87 by rod 88 to regulate the pressure of the fluid on both sides of the piston 89 in the servo-motor 72 by means of conduit 90 which will adjust the speed of the transmission gear 67 by the rod 91 and lever 92.

The template 1 is controlled by the pneumatic speedometer 81 by means of the belt 83 from shaft 74. The pressure of the speedometer 81 is communicated through the conduit 85 to the diaphragm chamber or casing 86 to control the jet pipe 87.

The constant delivery pump 95 supplies fluid, preferably air, to the speedometers 81 and 82 by means of conduits 96, as well as to the nozzle 19 by conduit 97.

The operation of the follow-up device in the cylinder 54 is generally the same as described in connection with Fig. 1, except that in Fig. 2 the conduits 60 and 61 are connected to both sides of a piston 98 in the servo-motor 73 controlling the transmission gear 68 by means of the rod 99, connected to the piston 98, and the lever 100.

It will be noted in Fig. 2 that the slide valve 38 of Fig. 1 is not utilized since it is not necessary as the return oil is not measured, but a jet pipe relay 87 is substituted in place thereof to control the transmission gear 67 by the sum of the two impulses in the diaphragm casings 86 and 94, which impulses are balanced by the spring 101. Therefore, in other words, the spring 101 causes the sum of the impulses to remain constant and consequently the relative movement velocity of the jet discharge from the nozzle 19 and the nozzle itself along the controlling edge of the template also remains constant.

The operation of the mechanism is, in general, the same as described in connection with applicant's aforesaid copending application. The purpose of the present invention has been described in the opening paragraphs of this specification and, in accordance therewith, the present invention makes it possible to reproduce any pattern such as a contour 102 in the pattern 1 which is to be cut in the work 7. It will be observed that such a contour has considerable lateral or linear length in a relatively short longitudinal distance or travel of the pattern and since the cutting torch 70 can cut only so fast, depending upon the material and thickness thereof, it is obvious that the rate of longitudinal travel of the work and slide must be reduced relative to the speed of travel of the work and slide when cutting a path, such as at 103, of the pattern 1. For this purpose, referring to Fig. 1, when the nozzles 19 and 20 reach a contour 102, an increase in pressure in nozzle 20, conduit 25 and diaphragm casing 29 will result, which will force the jet pipe 23 to the left to displace the block 53 and pistons 57 and 58 to the left. This will cause a slight increased axial movement of the rod 11 and the torch 70, so that the latter can cut the contour 102 in the work 7. At the same time, this will increase the pressure in the conduit 65 and on diaphragm 36 to actuate the pistons 40 and 41 to almost close the openings to the conduits 46 and 47, thereby slowing down the longitudinal movement of the rod 32, table slide 2 and the work 7 to thus permit the torch 70 to accurately reproduce the contour 102 in the work 7. It will be observed that the pistons 57 and 58 act to throttle the openings of conduits 60 and 61 and pistons 40 and 41 act to throttle the openings of conduits 46 and 47 to thereby control the longitudinal travel of the pattern relative to the linear contour thereof to be cut in the work.

The mechanism of Fig. 2 operates in the same manner to perform the same functions as in Fig. 1. The modification of Fig. 2, however, utilizes constant-speed electric motors to drive the work slide and the cutting torch through the intermediary of reversible and variable transmission gears 67 and 68, the latter of which are controlled by the special means which have been described and the operation of which may be briefly referred to in the following.

Assuming that the nozzles 19 and 20 reach a contour in the pattern 1, such as 102, then it is necessary that the rate of travel a of the slide 2, work 7 and pattern 1 be reduced. This is accomplished in that the pressure of the fluid in conduit 25 and chamber 29 will increase momentarily which will change the axial rate of travel of shaft 14 and the torch by an adjustment of the pistons 57 and 58, piston 98 and gear 68. This causes a change in the speed of shaft 75 which will act on the regulator 82 to increase the pressure in the conduit 93 and chamber 94. This latter will force the jet pipe 87 slightly against the spring 101 to adjust the piston 89 and the latter in turn the transmission gear 67 to slow down the speed of shaft 74 to ultimately decrease the rate of travel a of the table 2, pattern 1 and work 7. The change in speed of shaft 74 will act on the regulator 81 to decrease the pressure in conduit 85 and in chamber 86 to equalize, with the chamber 94, the force of the spring 101 to bring the jet pipe 87 back to its central position where equal pressures and no flow of fluid will take place in conduit 90. Thereby, the variable transmission gear 67 will operate at the set speed to move the table 2, pattern 1 and work 7 at a slower speed in the direction a than when a contour, such as at 103, is reproduced.

Obviously, the present invention is not restricted to the particular embodiments thereof herein shown and described. Moreover, it is not indispensable that all the features of the invention be used conjointly, since they may be employed advantageously in various combinations and sub-combinations.

I claim as my invention:

1. Mechanism of the class described comprising means for directing a fluid stream under constant pressure including two cooperating spaced nozzles between the ends of which the fluid stream passes from one into the other; a pattern cooperating by its contour with the fluid stream; means for moving said pattern in a longitudinal direction; a tool; follow-up means responsive to the pressure of the fluid in the receiving nozzle controlled by the pattern to operate the tool so that the latter will follow the contour of the pattern; and automatic control means connected to the pattern moving means, including impulse devices responsive to pressure impulses representing square functions of the speeds of the tool and the pattern, and means connected to combine the effect of the impulses on the control means, to maintain the relative speed of the pattern contour and the tool substantially constant.

2. Apparatus, as set forth in claim 1, wherein the means combining the effect of the impulses comprises a summarizing device connected to apply the algebraic sum of the impulses to the control means.

3. Mechanism according to claim 1, in which the means for moving the pattern in a longitudinal direction includes a pressure fluid motor, and in which the follow-up means includes a pressure fluid motor; and in which connected pressure responsive devices are provided for the two motors, and are arranged to be acted upon by the dynamic pressure of a pressure fluid flow which automatically varies with the rate of movement of the respective motors.

4. A machine tool comprising means for producing an air stream under constant pressure; a pattern adapted to cooperate with said fluid stream to partially interrupt said stream; a tool operatively connected to said air stream producing means; operating means connected to said tool and responsive to the pressure variations caused by a more or less partial interruption of the fluid stream by the pattern; means for causing relative movement between the pattern and the fluid stream whereby the tool will duplicate the configuration of the pattern on a work; and speed varying means, including control mechanism operated by combined pressure impulses which are proportional to square functions of the speeds of the pattern and the tool and connected to control the movement of the pattern as a function of the rate of the movement of the tool, whereby the movement of the contour of the pattern along the fluid stream and the operating or cutting speed of the tool will be maintained constant.

5. A machine tool comprising a frame; a table slidably mounted on said frame and adapted to receive a work piece; a template adapted to be removably secured on the table; a double-acting piston having a cylinder mounted on the frame; a tool connected to and guided by the piston; a pair of opposed nozzles arranged in spaced relation and connected to the piston and tool, one of said nozzles receiving fluid under a constant pressure and projecting it as a stream of fluid into the other nozzle and into the path of the contour of the template; means for operatively connecting the said other nozzle with the cylinder, whereby variations in fluid pressure in said other nozzle, dependent upon a more or less projection of the template into the fluid stream, will cause adjustment of the piston and the work piece corresponding to the contour of the template; and means for moving and controlling the movement of the template relative to the rate of the guiding movement of the tool, including a control device responsive to combined impulses proportional to the squares of the speeds of the tool and the template, whereby the speed of movement of the contour of the template and the cutting rate of the tool on the work, to reproduce the contour of the template, will be maintained constant.

6. A machine tool according to claim 5, in which a jet pipe relay is provided intermediate the said other nozzle and the cylinder and is responsive to pressure variations in the said other nozzle to control the rate of movement of the tool.

7. A machine tool comprising means for producing a fluid stream under constant pressure; a tool connected to said fluid stream producing means; a pattern having its contour intercepting a portion of the fluid stream; means for moving said pattern relative to the fluid stream; means for mounting said first-named means whereby the fluid stream will follow a floating guide action relative to the pattern, to adjust and guide the tool on the work, dependent upon the contour of the pattern; and automatic means for controlling the movement of the pattern and the work as a function of the rate of movement of the tool to reproduce the contour of the pattern, said automatic means including a control device responsive to combined impulses proportional to the squares of the speeds of the tool and the pattern.

8. A machine tool according to claim 7, in which the means for moving said pattern includes a constant speed electric motor and the controlling means includes a variable speed drive gear operating the pattern moving means, which is adjusted as a function of the rate of movement of the tool.

9. A machine tool according to claim 7, in which the means for moving said pattern includes a constant speed electric motor and a variable speed regulator of which the regulator is adjusted by said controlling means; and in which the means for guiding the tool is actuated by an electric motor and a variable speed drive gear of which the last-mentioned regulator is adjusted by said controlling means.

10. A machine tool comprising a pair of opposed nozzles spaced apart to project and receive a fluid stream; a tool; a movable pattern cooperating with and having its contour projecting into the fluid stream; a hydraulic device for guiding the tool; means responsive to the pressure of the fluid in the receiving nozzle controlled by the pattern to operate the hydraulic device so that the tool will follow the contour of the pattern; and hydraulic means connected to control the rate of movement of the pattern with respect to the tool, including a control device responsive to combined impulses proportional to the squares of the speeds of the tool and the pattern, whereby the relative rate of movement of the contour of the pattern and the operating or cutting speed of the tool will be maintained constant.

11. A machine tool according to claim 10, in which means is provided to connect the pair of opposed nozzles with the hydraulic device, said means acting as a support for the tool.

HERBERT ZIEBOLZ.